Figure 1:
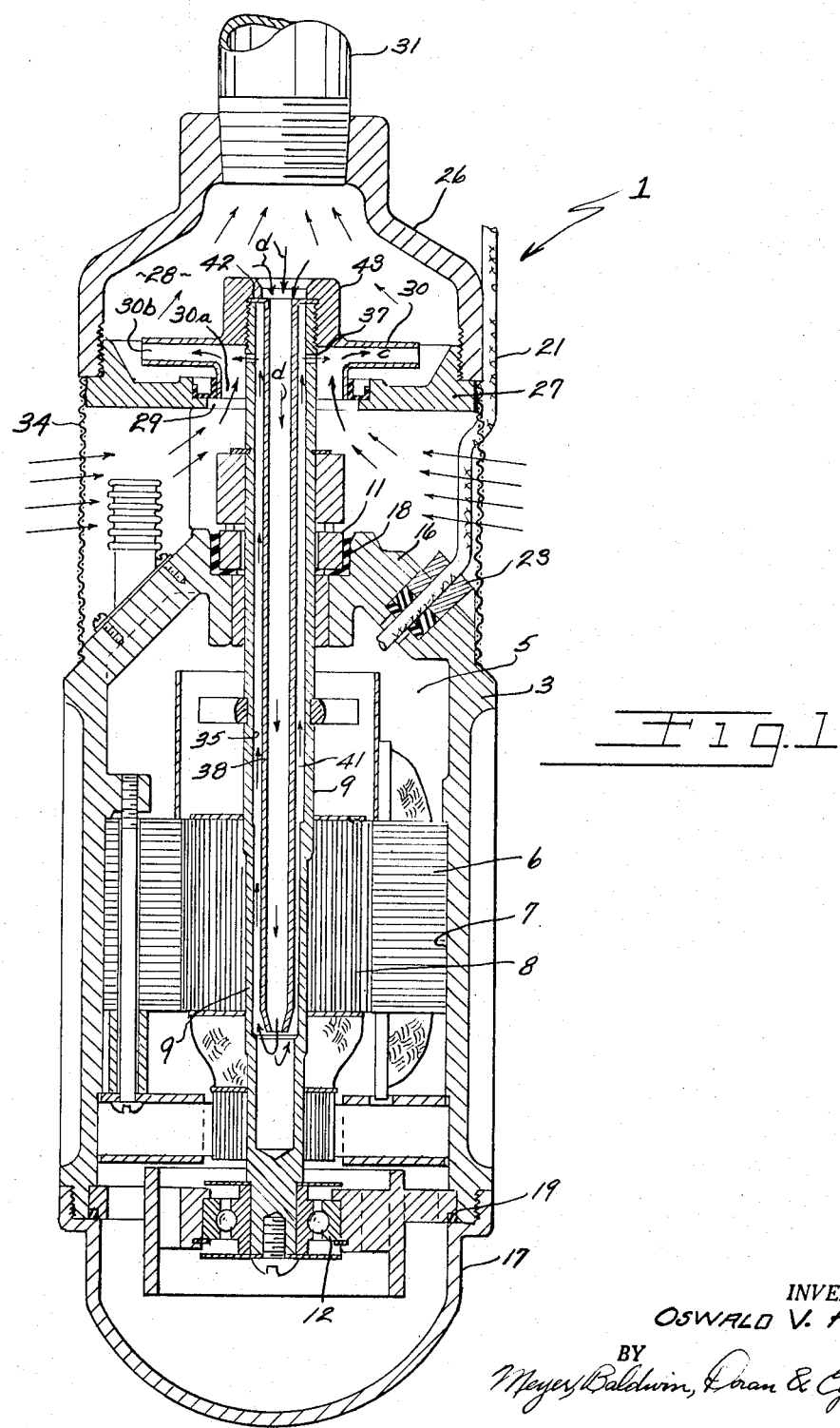

Aug. 23, 1966 — O. V. PAGE — 3,267,868
ELECTRIC MOTOR WITH PLURAL COOLING PATHS THROUGH THE SHAFT

Filed Nov. 13, 1963 — 2 Sheets-Sheet 1

INVENTOR.
OSWALD V. PAGE
BY
Meyer, Baldwin, Doran & Egan
ATTORNEYS

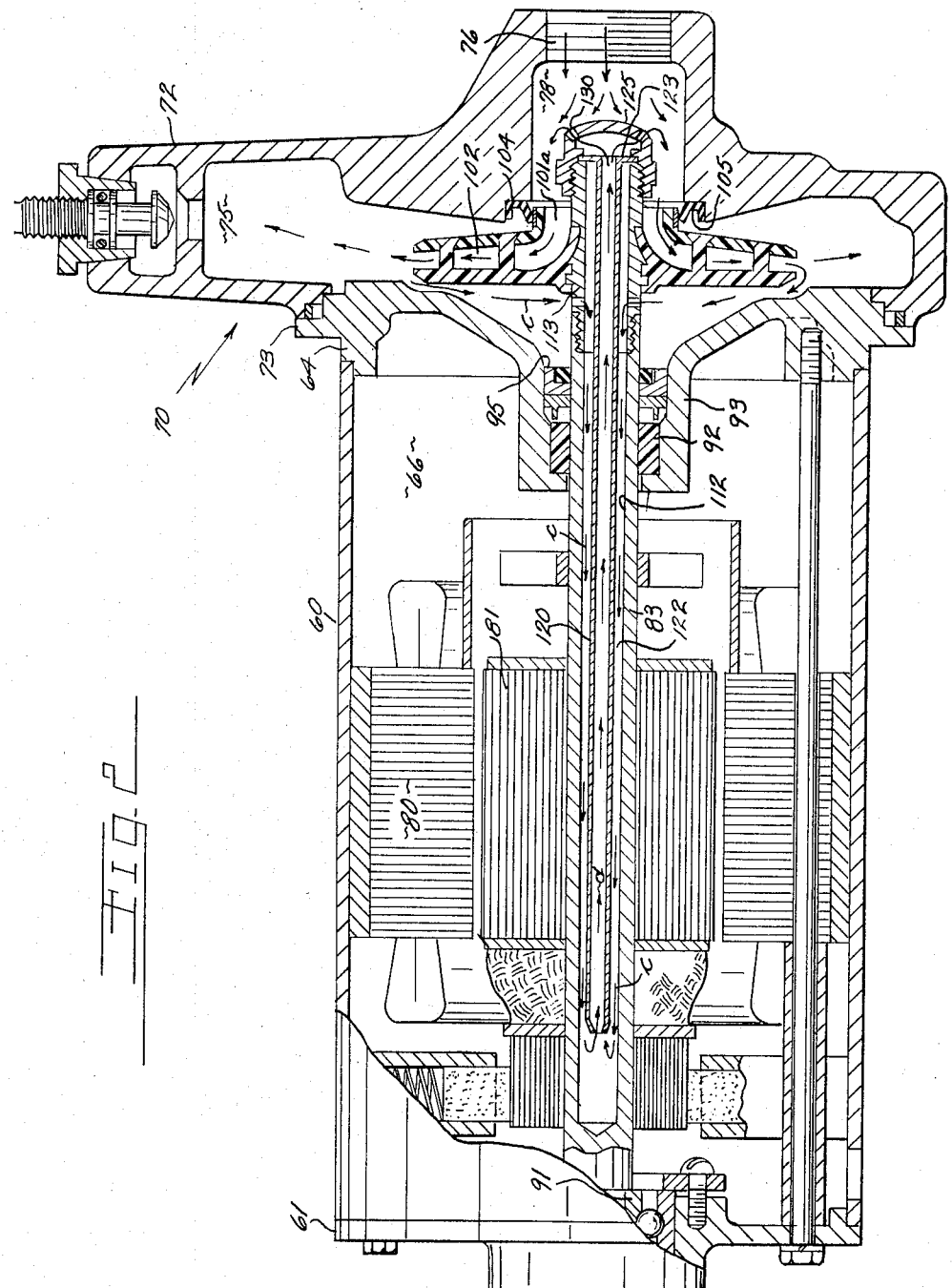

United States Patent Office 3,267,868
Patented August 23, 1966

3,267,868
ELECTRIC MOTOR WITH PLURAL COOLING PATHS THROUGH THE SHAFT
Oswald V. Page, Mansfield, Ohio, assignor to Barnes Manufacturing Co., Mansfield, Ohio, a corporation of Ohio
Filed Nov. 13, 1963, Ser. No. 323,293
10 Claims. (Cl. 103—87)

This invention relates to electric motors and more particularly to a novel and improved electric motor which is especially designed for use in a fluid pump assembly.

The electric motor of the present invention has particular utility for use in a pump assembly that is especially designed to pump water or other fluids from a well or like installation, one motor embodiment being herein illustrated for use in a submersible pump assembly while a second embodiment is designed for use in a pump assembly which is intended to be located exteriorly of the well or like installation.

As will be realized, when an electric motor is used as the power source to drive the pump unit of a fluid pump assembly, for example the impeller unit in an impeller-type pump, said motor is usually disposed in a liquid tight housing, and in this instance such motor is normally of the "self lubricating" type.

One of the major problems which heretofore has been apparent in the use of electric motors in pump assemblies of this type, is that the motor generates a substantial amount of heat during its normal operation, and only a portion of said heat is passed through the housing and dissipated through the air or fluid in the case of a submersible pump assembly so that the operating temperature of said motor is oftentimes at a relatively high value and consequently it appreciably accelerates the depreciation of the motor and hence reduces its operative life.

The electric motor of the present invention is intended to overcome this operative deficiency among others, by providing means whereby the fluid which the pump assembly is pumping is used as a coolant for the motor and is passed into and through the motor housing, in such manner, and being thus effective in said interval to remove a substantial quantity of heat from said housing and to thereby appreciably reduce the operating temperature level of said motor.

It is therefore a primary object of the present invention to provide an electric motor especially designed for use in a fluid pump assembly and wherein the fluid that is pumped by said assembly is also utilized as a coolant for said motor to effectively maintain the operating temperature of the motor at a satisfactory operating level.

Another object of the present invention is the provision of a new and improved electric motor especially designed for use in a fluid pump assembly and wherein a portion of the fluid flow of the pump is diverted to the electric motor being thus effective to act as a coolant and to thereby reduce the operating temperature of said motor to a safe level, said diverted fluid being subsequently returned to and combined with the fluid flow of the pump.

Still another object of the present invention is the provision of a new and improved electric motor especially designed for use in a fluid pump assembly, and wherein said motor has a rotor shaft rotatably mounted in a fluid leak-proof housing, one end of said shaft mounting a fluid impeller unit capable upon its being actuated to draw fluid into said assembly and to define a fluid flow from said pump, said shaft having means to divert a portion of the fluid flow to act as a coolant flow and to direct the same into and through the interior of the motor housing being thus effective during said interval to draw heat from said housing and to reduce the operating temperature level of the electric motor, and further wherein said shaft includes means for returning said diverted coolant flow to the output of the pump unit for combination therewith prior to its being pumped out of the said pump and to its ultimate destination.

Another object of the preesnt invention is the provision of an electric motor of the type referred to in the last preceding paragraph and wherein the shaft is hollow for a substantial portion of its length and communicates with the fluid pump flow so as to divert a portion of said flow through said shaft, and further wherein means in said hollow shaft communicates with said diverted flow and is operative to return said diverted flow to said pump flow resulting thereby in drawing heat away from said motor so as to decrease its operative temperature level.

Additional objects and advantages of the electric motor of the present invention will be apparent to one skilled in the art to which it pertains and upon reference to the following disclosure of several preferred embodiments thereof and which are illustrated in the accompanying drawings wherein:

FIG. 1 is a longitudinal sectional view of a submersible pump assembly having an electric motor embodying the present invention; and FIG. 2 is a longitudinal sectional view of a second embodiment of pump assembly embodying an electric motor of the present invention.

With reference directed to FIG. 1, the electric motor of the present invention is herein adapted for use in a submersible pump unit identified in its entirety by the reference numeral 1, and which is adapted to be totally immersed in a fluid such as, for example, in a water well or like installation in a vertical position as illustrated, whereby the water is pumped upwardly out of the well and to its ultimate destination.

The pump unit 1 is seen to include a housing 3 generally cylindrical in configuration and which has a sealed chamber 5 provided in the lower portion thereof into which is disposed the electric motor for said unit.

The electric motor is conventional in design having a stator assembly 6 mounted on the inside wall 7 of the chamber 5, and a rotor assembly 8 carried on shaft 9 which is disposed in said stator and rotatably supported by bearing assemblies 11 and 12 which, in turn, are supported within end wall 16 defining the upper end of housing chamber 5 and lower end bell 17 of said housing.

Suitable seals 18 and 19 carried by the respective bearing assemblies and disposed in sealing relation with said adjacent housing components are effective to seal said chamber from the surrounding well water.

Cable 21 passing through connector 23 mounted in the aforesaid housing wall 16 provides electric power to the motor components, said cable extending upwardly from the pump unit and out of the well installation for connection with a suitable source of electric energy.

The housing 3 is provided with an upper end bell 26 which is threadably attached in an upright position to a transverse housing flange 27, said end bell and flange defining an impeller chamber 28 therebetween. The flange 27 is provided with a central opening 29 through which the motor shaft 9 extends and which said opening defines the inlet to said impeller chamber.

The end bell 26 is provided with a threaded aperture in which is disposed one end of conduit 31 which defines the outlet from said impeller chamber.

The motor shaft 9 extends upwardly and centrally through the inlet to the impeller chamber 28 and is seen to mount an impeller 30 thereon.

With the electric motor energized, the shaft 9 and impeller 30 are rotated so as to draw water into the housing 3 through the filter screen 34 in the normal manner, thence through the inlet 29 to the impeller chamber 28 and into the eye 30a of said impeller in the general direction of arrows c. Said inlet flow is then propelled outwardly through the impeller passages 30b into the impeller chamber 28 to thereby define an output flow which may egress from said chamber upwardly through conduit 31.

A portion of the water passing into the impeller chamber is removed from said flow and diverted to act as a coolant for the electric motor so as to draw the heat from the interior of the motor and to thereby substantially reduce the operating temperature thereof.

To accomplish this, the shaft 9 is provided with a bore 35 extending centrally longitudinally therethrough for approximately its entire length, said bore being closed at its lower end. Radial ports 37 formed in the upper end of the wall of the shaft 9 connect said shaft bore with the eye 30a of the aforesaid impeller 30.

A tube 38 is disposed in the shaft bore 35, extending longitudinally therethrough in inwardly spaced relation to the wall of said bore to thus define an annular passage 41 therebetween, which passage communicates with the aforesaid radial ports 37. The bore 35 adjacent its lower end preferably comprises reduced diameter sections 36, 36a.

The upper end of the tube 38 is provided with an outturned flange 42 which is interposed between the upper end of the shaft 9 and the impeller hub 43 to thereby close the upper end of the passage 41, said tube being thus securely positioned in said shaft bore. The upper end of the tube likewise communicates through the impeller hub 43 to the impeller chamber 28 above the output level of the impeller.

The lower open end of the tube 38 may be constricted as at 45 and is spaced above the bottom of the bore 35, being so positioned to permit the passage of fluid therebetween.

With this assembly, as the water is drawn into the eye of the impeller 30 and into the impeller chamber 28 to define the output flow for the pump unit, a portion of said output flow is diverted therefrom and flows downwardly through the tube 38 in the direction of the arrows d, and into the bottom end of the hollow shaft 9, thence upwardly through the annular passage 41 and outwardly through the radial ports 37 wherein said diverted fluid is recombined with the impeller flow.

As will be realized, the fluid pressure in the impeller chamber 28 is a positive magnitude relative to the fluid pressure in the eye 30a of the impeller 30, and consequently the fluid flow through the aforesaid tube 38 and annular passage 41 will be sustained as long as the impeller is rotated.

As said coolant flow passes through the motor shaft 9 it draws the heat from the latter and adjacent motor areas being thus effective to lower the operating temperature level of said motor.

In this manner, the rate of depreciation of the motor is retarded so as to increase its operating life and hence the operating life of the pump assembly thereby permitting said assembly to be disposed in its submersible position for periods heretofore not possible to obtain.

In FIG. 2 is shown a pump assembly designed for use in a water system or the like wherein the pump is located exteriorly of the water source.

Merely for purposes of the instant disclosure, the pump unit is shown to be a single stage impeller-type pump, however, as will later appear, the present invention may be applicable to various other types of pump units including for example a multiple stage impeller-type pump.

As herein disclosed, the pump assembly is seen to include a somewhat cylindrical housing 60 adapted to be mounted in a horizontal position, said housing being closed at one end by end bell 61 and at the opposite end by end bell 64 to define a watertight motor chamber 66 therein.

A pump unit, as identified in its entirety at 70, is attached to the housing 60 and is seen to include a casting 72 attached to an annular flange 73 formed on said end bell 64 to define an impeller chamber 75. The casting 72 is provided with a port as indicated at 76 defining the inlet to said pump unit, said port communicating with bore 78.

The power source for the pump assembly comprises an electric motor of conventional design which is disposed in the housing chamber 66 and has its stator assembly 80 secured to the inside wall of the aforesaid housing 60, said motor likewise including a rotor 81 having a shaft 83 suitably rotatably journaled within bearing elements 91 mounted in the end bell 61 and sleeve bearing 92 carried in the hub 93 of the aforementioned end bell 64.

Suitable sealing elements as indicated at 95 mounted on the aforesaid shaft 83 are effective to seal the housing chamber 66 from the fluid entering into the impeller chamber 75.

The motor shaft 83 is seen to project through the hub 93 of the end bell 64 and into the impeller chamber 75 whereat an impeller 101 is suitably mounted thereon. The impeller 101 is disposed so as to be rotatable in generally a vertical plane. A self-compensating seal 104, U-shaped in cross section is attached to the casting 72 being disposed in annular recess 105 surrounding the bore 78 and has its one leg in sealing relation with the hub of the impeller 101, thus sealing the impeller chamber 75 from said bore.

With the electric motor energized, the impeller is rotated so as to draw water into the inlet port 76 and bore 78 and thence through the impeller eye 101e and into and through the impeller passages 102 into the impeller chamber 75 to define the fluid output for the pump unit.

As in the previous embodiment, a portion of the fluid flow passing into the impeller chamber 75 is diverted from said flow and passed through the motor shaft 83 thus acting as a coolant to reduce the operating temperature of said motor.

To accomplish this, the shaft 83 in its instant form is provided with a bore 112 extending longitudinally centrally therethrough for a substantial portion of its length, said bore being closed at the end thereof opposite the impeller 101. The impeller 101 is preferably mounted on a sleeve 113 which is threaded into the open end of the shaft 83 thus forming an extension of said shaft and hence permitting easy replacement of said impeller. Radial ports 116 formed in said sleeve 113 connect the shaft bore 112 with the aforesaid impeller chamber 75.

A tube 120 is disposed in the shaft bore 112, extending longitudinally therethrough in inwardly spaced relation to the wall of said bore to thus define an annular passage 122 therebetween.

The right end of the tube 120 is provided with an outturned flange 123 which is interposed between the right end of the sleeve 113 and a cap 125, said tube being thereby securely positioned and retained in said shaft bore.

The cap 125 is seen to be somewhat circular in cross sectional configuration and is provided with a plurality of spaced ports 130 connecting the inside of the tube 120 with the inlet bore 78.

The remote end of the tube 120 may be constricted as at 131 and is seen to be spaced from the closed end of the shaft bore 112, being thus positioned to permit the passage of fluid therebetween.

With this assembly, as the water is drawn into the impeller eye 101a a portion of said fluid passing into the impeller chamber 75 is diverted therefrom and into ports 116 in the direction of arrows c, said coolant flow passing from right to left through the aforesaid annular passage 122, thence into the tube 120, passing therethrough in the reverse direction or from left to right in the direction of the arrows d, thence through the ports 130 formed in the cap 125 whereat said flow is recombined with the inlet flow passing into the impeller eye 101a.

As in the previous embodiment, since the fluid pressure in the impeller chamber 75 is of a positive magnitude relative to the fluid pressure in the impeller eye 101a, said pressure differential is effective to provide a continuous flow of coolant fluid through the motor shaft 83 and tube 120 in the manner just described which is operable to draw the heat from said shaft and adjacent motor areas so as to decrease the operating temperature thereof.

Having thus described several preferred embodiments of electric motor embodying the concepts of the present invention as are hereinabove defined, it will be apparent to one skilled in the art to which it pertains that the same is susceptible to various modifications, combinations and arrangements of parts without departing from the scope of said invention as is defined in the appended claims.

What is claimed is:

1. In a motor-pump assembly, a motor housing defining a motor chamber and a pump housing defining an impeller chamber, a motor including a stator and a rotor disposed in said motor chamber, a rotatable shaft extending between and being disposed in said chambers, said rotor being secured to said shaft for rotation therewith, an impeller in said impeller chamber secured to said shaft for rotation therewith, said pump housing having inlet means communicating with the suction side of said impeller and outlet means communicating with the high pressure side of said impeller for directing liquid from said inlet means through said impeller to said outlet means, and means for cooling said shaft and adjacent motor chamber area with liquid from said pump housing, the last mentioned means comprising a first passage in said shaft extending generally lengthwise thereof, both ends of said first passage being closed, elongated means mounted in said first passage and defining a second passage extending generally lengthwise of said shaft, said elongated means being connected to the shaft-rotor-impeller assembly for rotation therewith, said second passage at one end thereof communicating with said first passage, orifice means in said shaft communicating one of said passages with the high pressure side of said impeller for introducing pressurized liquid from said pump housing into said one passage, and other orifice means communicating the other passage with the suction side of said impeller for egress of the pressurized liquid from said other passage, whereby liquid from said pump housing will circulate through said passages upon rotation of said shaft-rotor-impeller assembly, for cooling said shaft and adjacent motor chamber area, and thus cooling said motor.

2. A motor-pump assembly in accordance with claim 1 wherein said elongated means comprises a sleeve-like member of generally uniform cross section open at at least one end thereof and communicating at the last mentioned open end with said first passage, and means on said sleeve-like member constricting said last mentioned open end.

3. A motor-pump assembly in accordance with claim 1 wherein said one passage is open at both ends thereof, one end directly communicating with said high pressure side of said impeller and the other end thereof communicating with said other passage, and means constricting said other end at the communication between said first and second passages.

4. A motor-pump assembly in accordance with claim 1 wherein said first passage comprises a lengthwise extending bore in said shaft and said elongated means defining said second passage comprises a sleeve-like member of generally uniform cross section disposed in said bore in generally inwardly spaced relation to the defining surface of said bore, said sleeve-like member being connected to said shaft at one end of said sleeve-like member for rotation with said shaft-rotor-impeller assembly, said sleeve-like member being open at both ends thereof, said one end of said sleeve-like member communicating with the interior of said pump housing, the other end of said sleeve-like member communicating with said bore in spaced facing relation to a closed end of said bore, and means on said other end of said sleeve-like member forming a constriction of said second passage.

5. A motor-pump assembly in accordance with claim 1 wherein said first passage extends for substantially the full length of said shaft and through said attached rotor, and wherein said elongated means defining said second passage extends into the rotor area in spaced facing relation to a closed end of said first passage, said second passage being of generally uniform cross section throughout its length and having means at its said one end forming a constriction at the communication between said first and second passages.

6. A motor-pump assembly in accordance with claim 1 wherein said impeller on its suction side comprises an inlet eye encompassing said shaft in radially spaced relation thereto, inlet liquid upon rotation of said impeller being adapted to be drawn from said inlet means into said inlet eye and generally axially of said shaft and then to flow generally radially with respect to said shaft through said impeller and then to said outlet means, said other orifice means extending through said shaft into communication with said inlet eye for egress of liquid from said passages in the direction of generally radial flow of inlet liquid through said impeller.

7. A motor-pump assembly in accordance with claim 6 wherein said inlet eye is of cylindrical exterior configuration disposed in radially inward spaced relation to said pump housing, and sealing means coacting between the exterior of said inlet eye and said pump housing to prevent the flow of inlet liquid around said impeller instead of through the latter.

8. A motor-pump assembly in accordance with claim 1 wherein said first passage extends for substantially the full length of said shaft and through said rotor, said elongated means defining said second passage comprising a sleeve-like member of generally uniform cross section disposed in said first passage in generally inwardly spaced relation to the defining surface of said first passage, said sleeve-like member adjacent one end of said shaft being attached thereto and closing the associated end of said first passage, means at said one end of said second passage forming a constriction of said second passage at the communication between said first and second passages, and means in said first passage adjacent said one end of said second passage forming a constriction of said first passage.

9. A motor-pump assembly in accordance with claim 1 wherein said first passage comprises a lengthwise extending bore in said shaft and said second passage comprises an elongated sleeve-like member of generally uniform cross section disposed in said bore in generally inwardly spaced relation to the defining surface of said bore, said sleeve-like member being attached by means of an outturned flange at one end thereof to said shaft-rotor-impeller assembly for rotation therewith, said flange closing the associated end of said first passage, said sleeve-like member being open at both ends thereof, said one end thereof communicating with the suction side of said impeller and the other end thereof communicating with said bore in spaced facing relation to a closed end of said bore, and means on said other end of said sleeve-like member forming a constriction of said second passage, said other orifice means including a cap secured to said shaft, and ports in said cap communicating said one end of said sleeve-like member with the suction side of said impeller.

10. A motor-pump assembly in accordance with claim 9 wherein said impeller on its suction side comprises an inlet eye encompassing said shaft in radially spaced relation thereto, inlet liquid upon rotation of said impeller being adapted to be drawn from said inlet means into said eye and generally axially of said shaft and then to flow generally radially with respect to said shaft through said impeller and then to said outlet means, said ports in said cap extending diagonally outwardly with respect to said sleeve-like member and terminating in axially spaced relation to said inlet eye of said impeller.

References Cited by the Examiner

UNITED STATES PATENTS

| | | | |
|---|---|---|---|
| 1,733,379 | 10/1929 | Lowy | 310—61 X |
| 2,369,440 | 2/1945 | Curtis | 310—87 X |
| 2,524,269 | 10/1950 | Patterson | 310—54 X |
| 2,556,435 | 6/1951 | Moehrl | 310—87 X |
| 2,862,119 | 11/1958 | Else | 310—54 |
| 2,894,155 | 7/1959 | Labastie | 310—54 |
| 3,060,335 | 10/1962 | Greenwald | 310—54 |
| 3,135,211 | 6/1964 | Pezzillo | 310—87 X |

FOREIGN PATENTS 599,809  6/1934  Germany.

MAX L. LEVY, *Primary Examiner.*

MILTON O. HIRSHFIELD, *Examiner.*

J. W. GIBBS, *Assistant Examiner.*